United States Patent
Bluthgen et al.

(10) Patent No.: US 6,480,197 B1
(45) Date of Patent: Nov. 12, 2002

(54) TRANSMITTER, RECEIVER AND/OR RECORD CARRIER FOR USE WITH AN INFORMATION SIGNAL INCLUDING A CODED TEXT LINE HAVING CHARACTER CODES AND CONTROL CODES FOR CONTROLLING DISPLAY OF CHARACTERS DEFINED BY THE CHARACTER CODES

(75) Inventors: Björn Bluthgen, Celle (DE); Richard C. Spiero, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 08/368,740

(22) Filed: Jan. 4, 1995

Related U.S. Application Data (63) Continuation of application No. 08/015,098, filed on Feb. 2, 1993, now abandoned.

(30) Foreign Application Priority Data

| Feb. 19, 1992 | (EP) | 92200487 |
| Mar. 6, 1992 | (EP) | 92200642 |

(51) Int. Cl.⁷ .............................................. G06T 11/00
(52) U.S. Cl. ...................................... 345/467; 345/169
(58) Field of Search .......................... 345/156, 157, 345/169, 901, 121, 123, 124, 141, 467, 468, 469, 472.3; 370/110.4, 111, 110.1

(56) References Cited

U.S. PATENT DOCUMENTS 4,005,388 A * 1/1977 Morley et al. ............... 345/123
4,931,987 A * 6/1990 Kawakami .................. 345/123
5,111,426 A * 5/1992 Bergstresser ................ 364/492
5,218,187 A * 6/1993 Koenck et al. ............. 235/375

FOREIGN PATENT DOCUMENTS

| EP | 325325 | 7/1989 |
| EP | 389689 | 10/1990 |
| EP | 0432056 | 6/1991 |
| EP | 436991 | 7/1991 |
| EP | I0464482 | 1/1992 |

OTHER PUBLICATIONS

Stalling, Data and Computer Communications, Second Edition, 1988, pp 100–102.*

* cited by examiner

Primary Examiner—Chanh Nguyen
(74) Attorney, Agent, or Firm—Michael E. Belk (57) ABSTRACT

An information transfer system which transmits and receives an information signal including a coded text line, and displays characters, defined by character codes included in the coded text line, on a display unit having a display capacity which is less than the number of character codes included in the coded text line. The system includes a transmitter for producing and transmitting the information signal, a record carrier for storing the information signal, and a receiver for receiving the information signal and displaying the characters on the display unit. The information signal includes main data and sub data, which sub data includes the coded text line. The coded text line includes the character codes and control codes. The receiver includes the display unit and a display control unit for controlling display of the characters in accordance with the control codes.

33 Claims, 7 Drawing Sheets

FIG. 1

Byte 0 : LANGUAGE NUMBER, APPLICATION CODE

-bit 6-4 = LANGUAGE .NUMBER

000 Language-independent text, or only one language is provided.
001 Main language if various languages are recorded.
010 ⎫
¦¦¦ ⎬ Additional language
111 ⎭

-bit 3-0 = APPLICATION CODE

0000 Text Packet for 2-line and 21-line displays, based on a 40-character per line font.
1000 As "0000", but also for 1-line displays.

FIG. 3

|   | 7 | 6 | 5 | 4 | 3 | 2 | 1 | 0 |
|---|---|---|---|---|---|---|---|---|
| 0 | 1 | LN | | | | | A C | |
| 1 | | | | | | | | |
| 2 | | | | | | | | |
| 3 | 0 | 0 | 0 | 0 | 0 | 0 | 0 | 1 |
| 4 | TC | | | | | | | |
| 5 | 21 PC | | | | | 2PC | | |
| 6 | | | | | | | | |
| 7 | 0 | 0 | 0 | 0 | 0 | 0 | 0 | 0 |
| 8 | TLC Φ | | | | | | | |
| ⋮ | | | | | | | | |
| 47 | TLC 40 | | | | | | | |

FIG. 2

| Col/Row | | 1 Line Display Control codes |
|---|---|---|
| 11 | S | Start code |
| 15 | P | Pause code |
| 19 | H0 | Scroll, default speed |
| 1A | H1 | Scroll, speed 2 |
| 1B | H2 | Scroll, speed 3 |
| 1C | H3 | Scroll, speed 4 |

FIG.4

| | 0x | 1x | 2x | 3x | 4x | 5x | 6x | 7x | 8x | 9x | Ax | Bx | Cx | Dx | Ex | Fx |
|---|---|---|---|---|---|---|---|---|---|---|---|---|---|---|---|---|
| x0 | | | | 0 | @ | P | ` | p | | | | | | | | |
| x1 | | | ! | 1 | A | Q | a | q | | | | | | | | |
| x2 | | | | | | | | r | | | | | | | | |
| x3 | | | | | | | | s | | | | | | | | |
| x4 | | | | | | | | t | | | | | | | | |
| x5 | CONTROL CODES | | | | | | | u | | | | | | | | |
| x6 | | | | | | | | v | | | | | | | | |
| x7 | | | OTHER CHARACTERS | | | | | w | | | | SPECIAL CHARACTERS | | | | |
| x8 | | | | | | | | x | | | | | | | | |
| x9 | | | | | | | | y | | | | | | | | |
| xA | | | | | | | | z | | | | | | | | |
| xB | | | | | | | | { | | CONTROL CODES | | | | | | |
| xC | | | | | | | | \| | | | | | | | | |
| xD | | | | | | | | } | | | | | | | | |
| xE | | | | | | | | ~ | | | | | | | | |
| xF | | | | | | | | □ | | | | | | | | |

FIG.9

TAPE FRAME (N):

| | |
|---|---|
| 8 bytes Sysinfo header | $SI_0$ <br> $SI_7$ |
| 8 bytes packet header | $SI_8$ <br> $SI_{15}$ |
| 40 bytes Coded text line | $SI_{16}$ <br> $SI_{55}$ |
| 8 bytes packet header | $SI_{56}$ <br> $SI_{63}$ |
| 40 bytes of coded text line | $SI_{64}$ <br> $SI_{103}$ |
| 8 bytes packet header | $SI_{104}$ <br> $SI_{111}$ |
| 16 bytes of bytes of coded text line | $SI_{112}$ <br> $SI_{127}$ |

Packet 1 — Packet 1
Packet 2 — Packet 2
Packet 3 — Packet 3

TAPE FRAME (N+1):

| | |
|---|---|
| 8 bytes Sysinfo header | $SI_0$ <br> $SI_7$ |
| 24 bytes of coded text line | $SI_8$ <br> $SI_{31}$ |
| 8 bytes packet header | $SI_{32}$ <br> $SI_{39}$ |
| 40 bytes of coded text line | $SI_{40}$ <br> $SI_{79}$ |
| 8 bytes packet header | $SI_{80}$ <br> $SI_{87}$ |
| 40 bytes of coded text line | $SI_{88}$ <br> $SI_{127}$ |

Packet 3
Packet 4 — Packet 4
Packet 5 — Packet 5

| A | B | C | H | I | J | K | L | M |
|---|---|---|---|---|---|---|---|---|

| T | O | O | N | E | R | D | L |
|---|---|---|---|---|---|---|---|

| | |
|---|---|
| t1 | A |
| t2 | A B |
| t3 | A B C |
| t4 | A B C D |
| t5 | A B C D E |
| t6 | A B C D E F |
| t7 | A B C D E F G |
| t8 | A B C D E F G H |
| t9 | A B C D E F G H I |
| t10 | A B C D E F G H I J |
| t11 | A B C D E F G H I J K |
| t12 | A B C D E F G H I J K L |
| t13 | A B C D E F G H I J K L M |
| t14 | A B C D E F G H I J K L M N |

TRANSMITTER, RECEIVER AND/OR RECORD CARRIER FOR USE WITH AN INFORMATION SIGNAL INCLUDING A CODED TEXT LINE HAVING CHARACTER CODES AND CONTROL CODES FOR CONTROLLING DISPLAY OF CHARACTERS DEFINED BY THE CHARACTER CODES

This is a continuation of prior application Ser. No. 08/015,098, filed on Feb. 2, 1993, now abandoned.

BACKGROUND OF THE INVENTION

The invention relates to an information transfer system, comprising a receiver, and a transmitter for transferring an information signal to the receiver via a transfer medium. The information signal comprises main data and sub data, the sub data comprising a coded text line having a plurality of character codes. The receiver is provided with a character display unit for displaying characters defined by the character codes in the coded text line, which display unit has a predetermined number of character display positions The invention further relates to a transmitter, a receiver and a record carrier for use in the system.

A system as described in the opening paragraph is known from EP-A-0,325,325. In that patent application, a system is described in which an information signal is transferred via a record carrier, for example, a Compact Disc or a digital audio tape, to an audio player. The player is provided with at least one multi-line display unit for displaying text lines defined by coded text lines included in the sub data transferred. The number of character positions (i.e., digits) of the display unit is sufficient to display a full text line of forty characters. By means of the system, additional information related to the main (audio) information reproduced can be displayed.

Full line display units are undesirable for use with systems of the type described above when small sized receivers, such as, for example, portable players and car radios, are used in those systems, because, in general, there is not enough space available for such full line display units. Full line display units are also undesirable for use on remote controllers for receivers. On the other hand, it is desirable that additional information related to reproduced main information can be displayed on display units of small sized receivers and remote controllers.

SUMMARY OF THE INVENTION

It is an object of the invention to provide means which enable significant parts of text information available from the sub data to be shown on display units of small-sized receivers and remote controllers without the requirement of far-reaching amendments to the sub data format.

According to the invention, this object is achieved by a system of the type described in the opening paragraph being characterized in that the predetermined number of character positions of the display unit is less than the number of character codes in the coded text line, and the coded text line further includes control codes. The receiver for that system comprises a display control unit for controlling display of the characters corresponding to (i.e., defined by) the character codes included in the coded text line in dependence on the control codes.

In the system according to the invention, the information already available in the coded text line (included in the sub data) for displaying on a full line display unit, can also be used for display on a small sized display unit with a limited number of character positions. This has the advantage that the addition of coded text to the sub data for exclusive use in combination with a 1-line display with a limited number of digits is not required.

An embodiment of the system is characterized in that the receiver further comprises a unit for storing the coded text line in a memory, the control codes comprise horizontal scrolling control codes, and the display control unit is adapted to initiate, in response to the horizontal scrolling control codes, the display unit to horizontally scroll through the characters of the coded text line stored in the memory. By using a combination of a memory and a scroll function, presentation of the contents of a complete coded text line is possible.

A further embodiment of the system is characterized in that the receiver further comprises an entry unit for manually entering scroll commands, and the display control unit is adapted to control a horizontal scroll of the characters of the coded text line stored in the memory in dependence on the entered scroll commands. This embodiment has the advantage that the user can initiate a horizontal scroll of the characters of the coded text line stored in the memory each time he or she finds that desirable.

Further embodiments of the system are characterized in that the display control unit is adapted to cause the display unit horizontally scroll through the characters with a speed dependent on the scrolling control codes or the entered scrolling commands. These embodiments enable adaption of the scroll speed on specific circumstances.

Another embodiment of the system is characterized in that the control codes comprises marking codes for marking a portion of the character codes, and the display control unit includes a unit for selecting which of the characters are to be displayed on the display unit on the basis of the marking codes. This embodiment enables the presentation of the most significant words of a message on the display unit. Preferably the characters (i.e., character strings) to be displayed are placed between a start code and a pause code. In that event, it is preferred to use a system, characterized in that the display control unit is adapted to cause a space-type character to be displayed in response to a pause code, and prohibit display of a character in response to a start codes. This embodiment provides a very suitable separation (on the display unit) between different character strings which are defined by the coded text line.

A further embodiment of the system is characterized in that the sub data comprises text packets which each include a coded text line and additional control codes, certain of the text packets including an indicating control code indicating that text packet includes a coded text line with text information to be displayed on the display unit (with the limited display positions); and the receiver further comprises a unit for determining which of the text packets include an indicating control code, and a unit for supplying the certain text packets to the display control unit. By the use of the indicating code, the display control unit is prevented from making unnecessary searches in coded text lines which does not include characters to be displayed on the 1-line display unit with a limited number of digits.

A receiver, transmitter and record carrier which are usable with the above-described systems, receive, transmit and store, respectively, an information signal including sub data having a coded text line including character codes and control codes for controlling display of characters defined by the character codes. In addition, the receiver includes a character display unit having less character display positions than there are character codes in a coded text line.

BRIEF DESCRIPTION OF THE DRAWINGS

The invention will now be described in more detail, by way of example, with reference to the accompanying drawing, in which.

DESCRIPTION OF THE PREFERRED EMBODIMENTS

Figure 1:
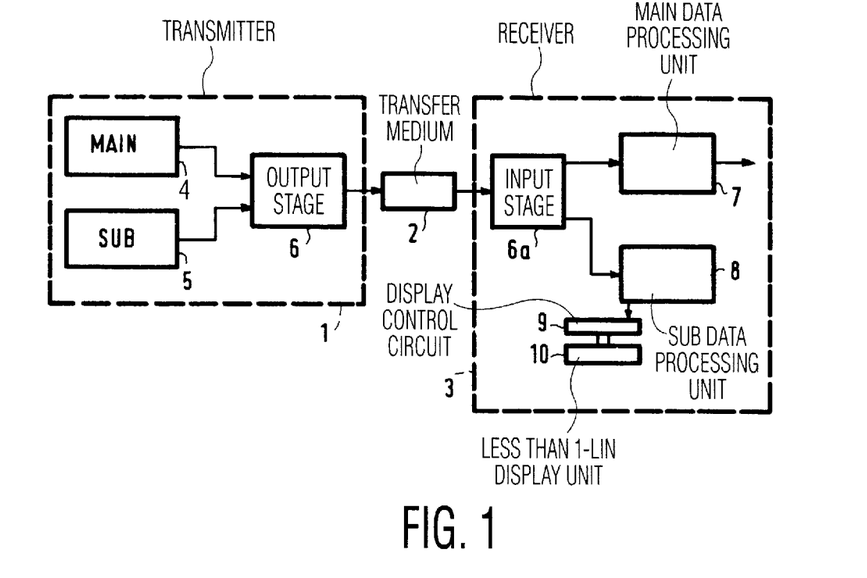
FIG. 1 shows an embodiment of a system according to the invention.

FIG. 1 shows, by way of example, an embodiment of a information transfer system according to the invention. The system comprises a transmitter, 1 for transferring an information signal to a receiver 3 via a transfer medium 2.

The transmitter 1 of FIG. 1 comprises a usual source 4 of main data, e.g., digital audio information, and a source 5 of sub data related to the main data. The sub data comprises coded text lines and control codes. The main data and sub data are supplied to an output stage 6 which transfers the main data and the sub data in a suitable signal format to the transfer medium 2.

The receiver 3 of FIG. 1 comprises an input stage 6*a* for receiving the information signal transferred via the transfer medium 2. The input stage 6*a* separates the main data and the sub data from the information signal it receives. The main data is supplied to a main data processing unit 7 of a usual type for processing the main data. The sub data is supplied to a sub data processing unit 8 for processing the sub data. The sub data processing unit 8 supplies coded text lines and corresponding control codes to a display control circuit 9 of a 1-line display unit 10 having a limited number of character positions (i.e., digits), i.e., less character positions than characters associated with a coded text line, for example a 12-digit display unit. The display control circuit 9 controls the display of characters defined by character codes included in the coded text lines in dependence on control codes also included in the coded text lines.

The information transfer system can be of type in which the sub data is arranged in packets. In those packets, coded text lines can be included. Packets which each include a coded text line will be referred to hereinafter as text packets. Each coded text line is made up of a sequence of a predetermined number of text line codes. According to the invention, the text line codes comprise character codes defining characters to be displayed and control codes for controlling the display of character strings on the 1-line display unit having a number of character positions (i.e., digits) which is insufficient to display a complete text line at once. The control codes included in the text line codes will be referred to Hereinafter as serial control codes. The packets may further comprise additional control codes not included in the text line codes. These additional control codes will be referred to hereinafter as parallel control codes. A suitable format for the packets is described in detail in EP-A-0,325,325 and EP-A-0,389,689, which documents are incorporated herein by reference.

Figure 5:
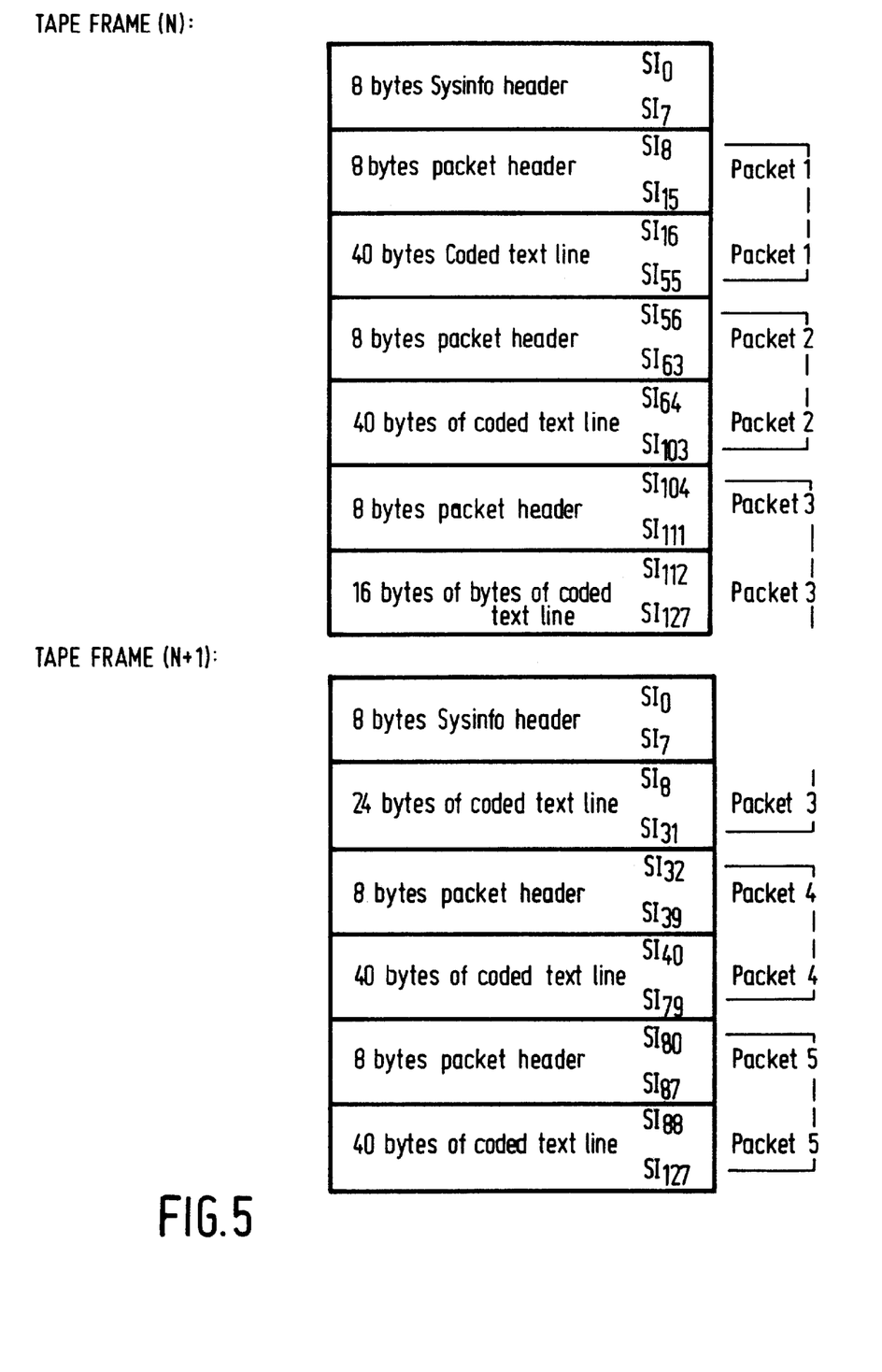
FIG. 5 shows, by way of example, how packets can be incorporated in the sub data of a digital compact cassette.

The transfer medium 2 of FIG. 1 may be a Compact Disc in which digital main (audio) data is recorded and in which text packets are included in so-called R to W subcode channels. The transfer medium 2 may also be a so-called Digital Compact Cassette in which main data, in the form of compressed audio information, and sub data are recorded on a magnetic tape. Text packets may be included in the sub data recorded on the Digital Compact Cassette. For a more detailed description of a Digital Compact Cassette System, reference is made to EP-A 0,436,991, which is incorporated herein by reference. FIG. 5 shows, by way of example, how packets can be incorporated in the sub data format of the Digital Compact Cassette System described in EP-A 0,436,991. The transfer medium 2 may also be a digital audio broadcast channel via which a digital audio signal and text packets are transferred. For a more detailed description of such a broadcast system, reference is made to EP-A-0,389,689.

Figure 2:
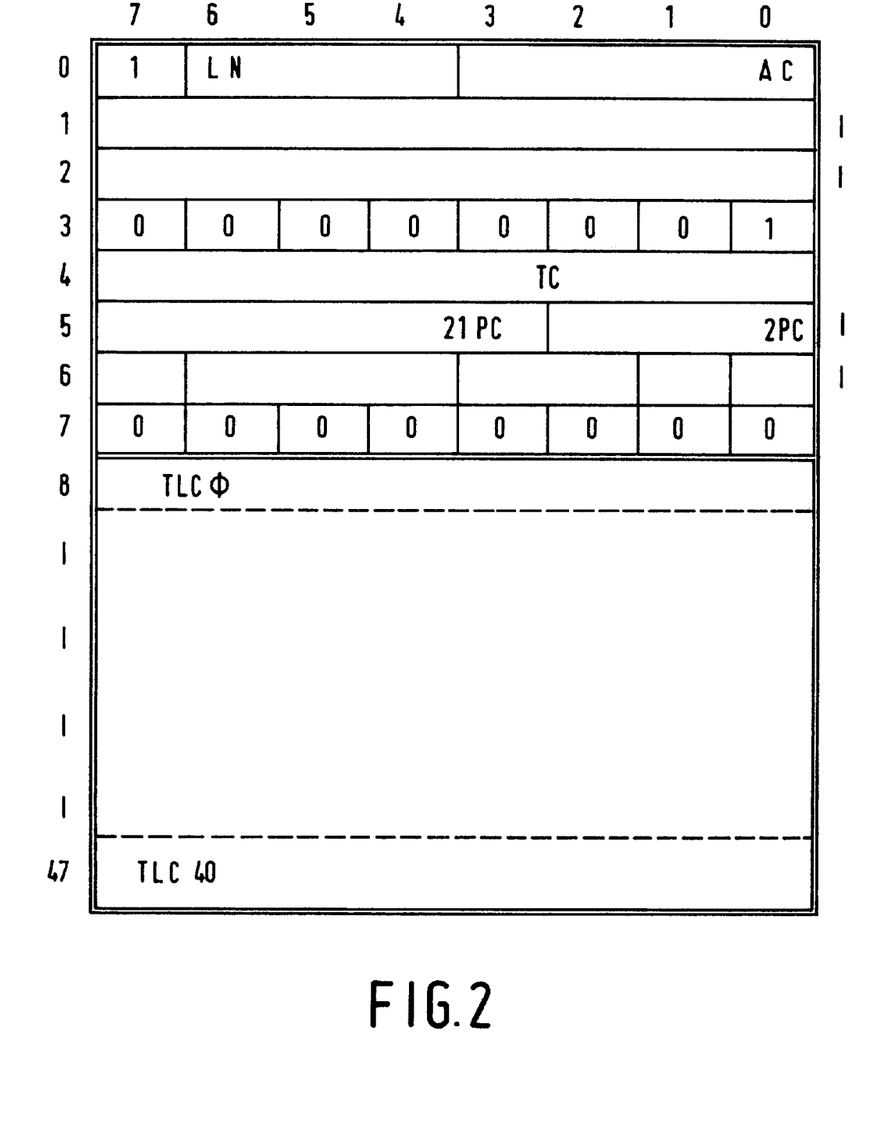
FIG. 2 shows a suitable format of a packet for transferring a coded text line.
Figure 3:
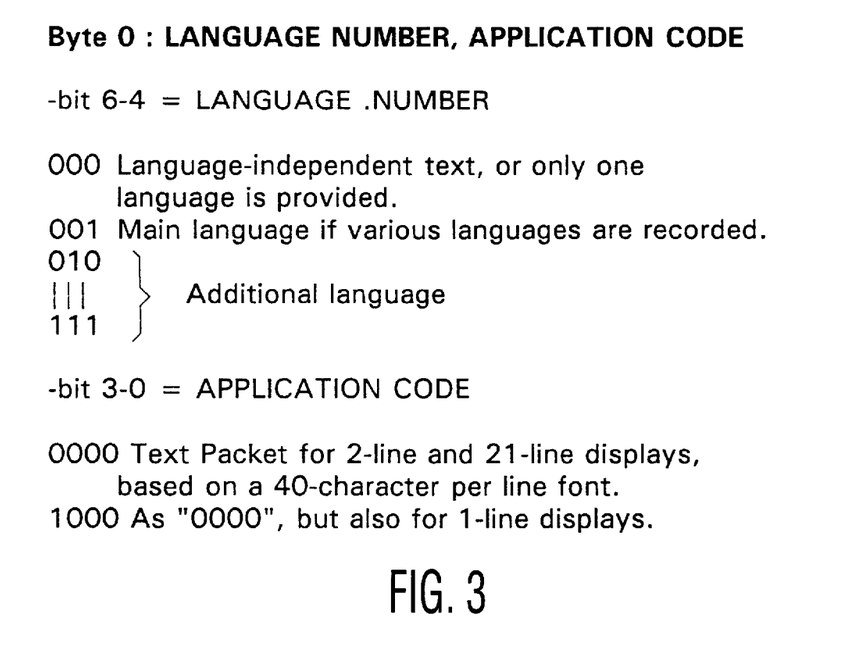
FIG. 3 shows an example of parallel control codes included in a packet.

FIG. 2 shows a suitable format of a text packet. The text packet shown comprises forty eight bytes of eight bits each. The first eight bytes are used for the transfer of parallel control codes. The parallel control codes comprise positions codes 21PC and 2PC. The position code 21PC indicates the line position on which the corresponding text line of the text packet is to be displayed on a 21-line display. The position code 2PC indicates the line position of the corresponding text line in the event a 2-line display is used. The parallel control codes comprise three control codes which are used for selecting specific coded text from the text packet received. These control codes are indicated as LN (language number), AC (application code) and TC (topic code). The control code LN indicates the language of the coded text in the corresponding coded text line. The control code AC indicates whether the corresponding coded text line comprises information to be displayed on the 1-line display unit 10. The code TC indicates the topic to which the corresponding coded text line relates. Such topics may be, for example, "album information", "performers name" or "The text of the reproduced song".

In the text packet format shown in FIG. 2, forty bytes (i.e., bytes 8–47) are used for transferring the text line codes TLC0, . . . , TLC40 of the coded text line. The text line codes may comprise a character code defining a character from a character set. The text line codes may also comprise serial control codes for the control of the display.

Figure 9:
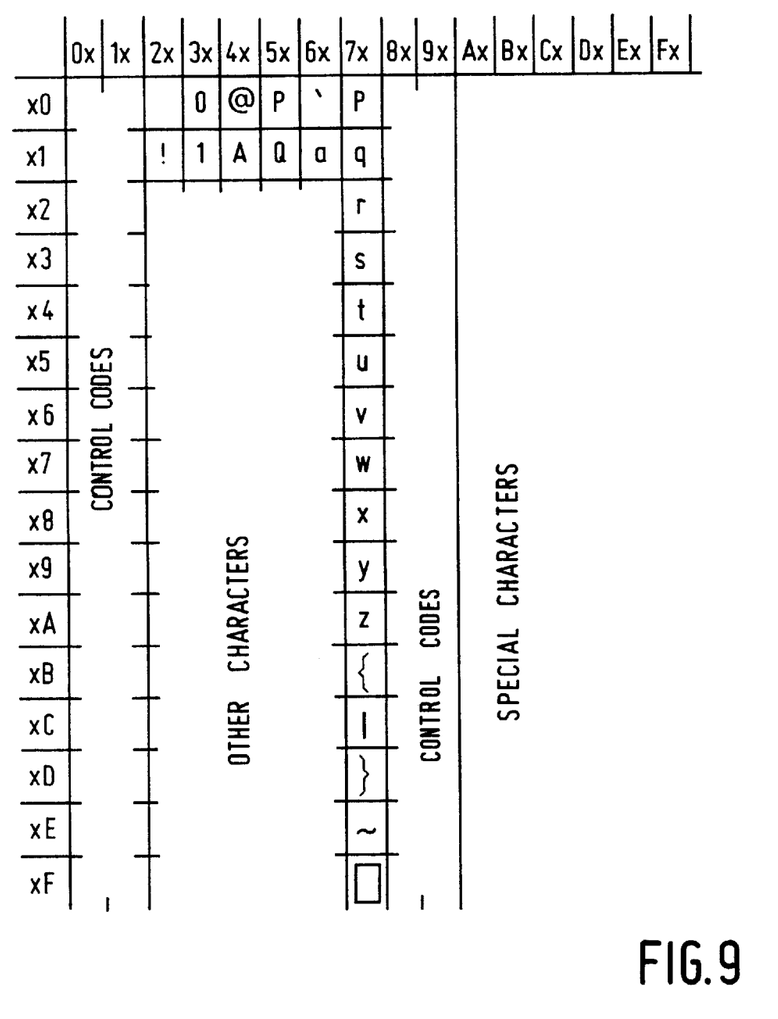
FIG. 9 shows a possible relation between the character codes and corresponding characters.

FIG. 9 shows the relation between the values (hexadecimal) of the text line codes and corresponding characters. The text line codes in columns 0x, 1x, 8x and 9x are reserved for the serial control codes.

Figure 4:
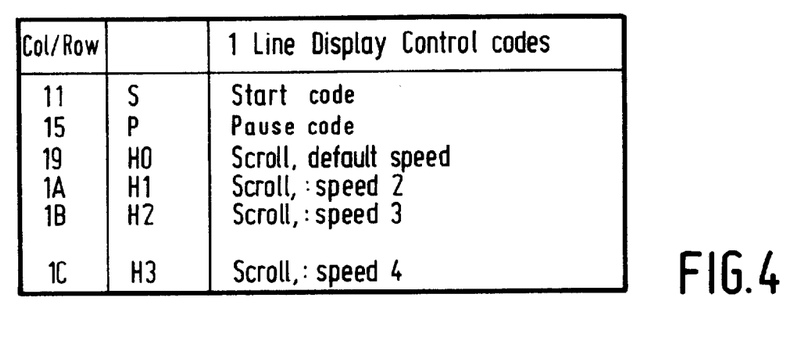
FIG. 4 shows examples of serial control codes which may included in a coded text line.

FIG. 4 shows an overview of the serial control codes used in the embodiment described. FIG. 4 shows two marking codes for marking groups of character codes to be used for displaying a text string. Those marking codes comprises a start control code S, which is used to indicate the begin of a text string to be displayed on the 1-line display unit 10, and a pause control code P, which is used to indicate the end of a text string to be displayed on the 1-line display unit 10. FIG. 4 also shows four scrolling control codes H0, H1, H2 and H3, having the values 19, 1A, 1B, and 1C, respectively, used for initiating a horizontal scroll with four different scrolling speeds.

Figure 6:
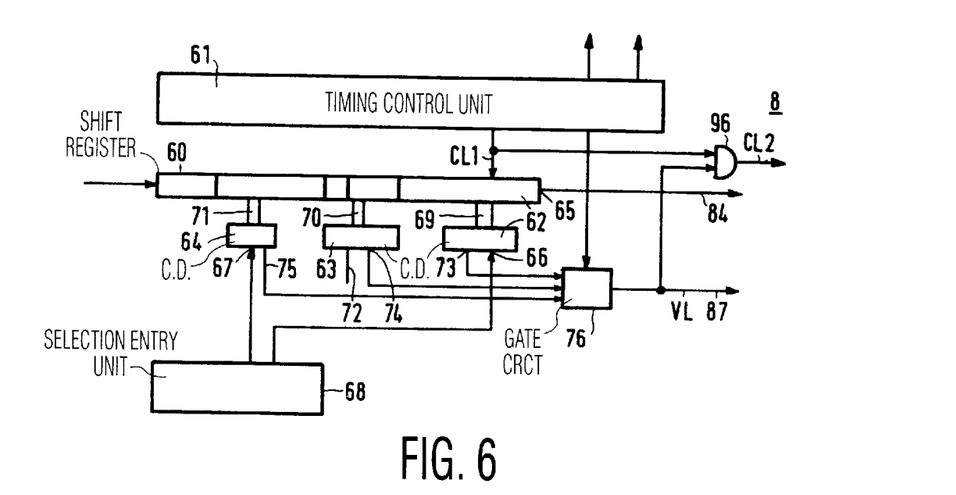
FIG. 6 shows an embodiment of a sub data processing unit for use in a system according to the invention.

FIG. 6 shows an embodiment of the sub data processing unit 8 of FIG. 1. The sub data processing unit 8 comprises a memory in the form of a shift register 60 in which the bytes of the text packet received from the input stage 6a are shifted in synchronism with a clock signal CL1 received from a timing control unit 61 of a usual type. The sub data processing unit 8 is further provided with code coincidence detecting circuits (C.D.) 62, 63 and 64. The code coincidence detecting circuits 62 and 64 are provided with inputs 66 and 67, respectively, for receiving a user selected value for the language selection code LN and the topic selection code TC from a user selection entry unit 68 of usual type, for example, an operation panel with selection keys. The code coincidence detecting circuit 63 has an input 72 for receiving a code value corresponding with the value of the application code AC indicating that the corresponding coded text line comprises information to be displayed on the 1-line display unit 10. Inputs 69, 70 and 71 of the code coincidence detecting circuits 62, 63 and 64 are coupled to parallel outputs of the shift register 60 such that at the moment that the first byte of a received text packet reaches a serial output 65 of the shift register 60 the values of the codes LN, AC and TC are supplied to the code coincidence detecting circuits 62, 63 and 64, respectively. The code coincidence detecting circuits 62, 63 and 64 are provided with outputs 73, 74 and 75, respectively, for supplying corresponding detection signals to a gate circuit 76 in the event that coincidences between the code values on the inputs of the circuits 62, 63 and 64 are detected. The gate circuit 76 is of a usual type that, under control of the timing circuit 61, generates a load signal VL during the time that the codes of the coded text line become available at the output 65 of the shift register 60 after detections of coincidences by all three code coincidence detecting circuits 62, 63 and 64. The load signal VL is supplied to an input of a two input AND-gate 96. The clock signal CL1 is supplied to the other input of the AND-gate 96, so as to obtain at the output of the AND-gate 96 a clock signal CL2 exclusively during the generation of the load signal VL. Both the clock signal CL2 and the load signal VL are supplied to the display control circuit 9 of FIG. 1.

The sub data processing unit 8 operates as follows: In the event that the parallel control codes LN and TC correspond with the user selected values selected therefore, and, at the same time, the parallel control code AC indicates that the coded text line in the corresponding text packet comprises information to be displayed on the 1-line display unit 10, then the gate circuit 76 starts generating a load signal VL as soon as the first code of the coded text line reaches the output 65 of the shift register 60. As soon as the first parallel control code of the next text packets reaches the output 65 the generation of the load signal VL is stopped.

Figure 7:
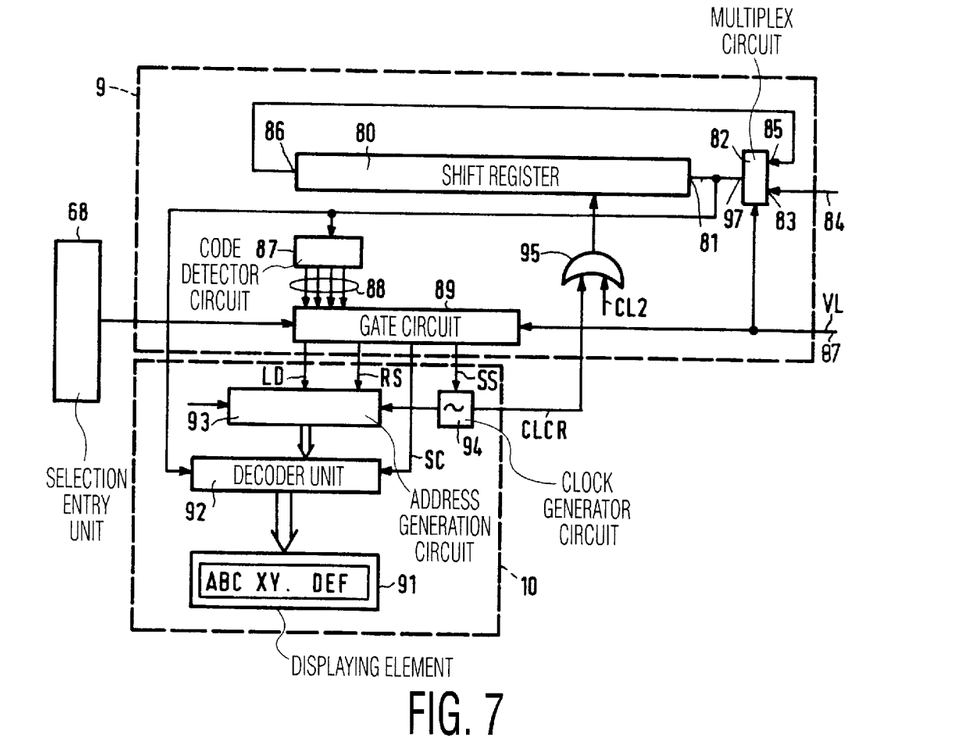
FIG. 7 shows embodiments of a display control unit and a display unit for use in a system according to the invention.

FIG. 7 shows embodiments of the display control unit 9 and the display unit 10 of FIG. 1. The display control unit 9 comprises a shift register 80 having a number of subsequent byte storage positions which is equal to the number of codes in the coded text line. The shift register 80 shifts the codes received at an input 81 through the register to an output 86 in synchronism with either the clock signal CL1 received from the timing circuit, via a OR-gate 95, of a clock signal CLCR received from a clock generator circuit 94 with an adjustable oscillating frequency. The input 81 is coupled to a two-input multiplex circuit 82. A first input 83 of the multiplex circuit 82 is coupled to the output 65 of the shift register 6 of the sub data processing unit 8 of FIG. 6 via a signal patch 84. A second input 85 of the multiplex circuit 82 is coupled to the output 86 of the shift register 80. An output 97 of the multiplex circuit 82 is coupled to an input 81 of the shift register 80. The multiplex circuit 82 is controlled by the load signal VL which is supplied to a control input of the multiplex circuit 82 via a signal line 87.

In the event that the load signal VL indicates that a coded text line is available at signal path 84, the codes of that coded text line are fed via the multiplex circuit 82 to the input 81 of the shift register 80. At the same time the shift register 80 receives the clock signal CL2, so that the codes of the coded text line, available at the output 65, are shifted into the shift register 80 in synchronism with the clock signal CL2. In the event that the load signal VL indicates that no codes of a coded text line with information to be displayed on the 1-line display unit 10 are available at signal path 84, the codes, as they become available at the output 86 of the shift register 80 are supplied to the input 81 via the multiplex circuit 82.

The display control unit 9 of FIG. 7 is further provided with a code detection circuit 87 having an input coupled to the output 97 of the multiplex circuit 82. The code detection circuit 87 is of usual type which detects whether the code at the output 97 of the multiplex circuit 82 coincides with a serial control code or a character code defining a space. The detection circuit 87 generates a corresponding output signal when one of the codes mentioned hereinbefore is detected. Further the control signals generated by the detection circuit 87 indicates which type of control code has been detected, in the event that the detected control code corresponds with a start control code S, a pause control code P or one of the scroll control codes H0, H1, H2 or H3. Those control signals are supplied via signal lines 88 to a gate circuit 89. The load signal VL is also supplied to the gate circuit 89. A further input of the gate circuit 89 is coupled to an output of the user selection entry unit 68 for receiving a user entered scroll command.

The gate circuit 89 of FIG. 7 derives control signals for the display unit 10 from the signals received at its inputs. Generation of a first control signal LD is started in response to detection of a first character code after the start of a generation of the load signal VL not being a space code. Generation of the control signal LD is also started in response to the detection of a start control code S. Generation of the control signal LD is stopped in response to the detection of a pause control code P. In addition, the control signal LD is generated during each detection of a pause control code P in order to ensure that a "space" character is displayed for each pause code. The control signal LD indicates that a character is to be displayed on the next empty character position of a 12-digit displaying element 91 of the display unit 10. A second control signal SC is generated in response to a detection of one of the scroll control codes H0, H1, H2 or H3 or in response to a user entered scroll command. The control signal SC indicates that a horizontal scroll of characters corresponding with the subsequent codes outputted by the shift register 80 is requested on the displaying element 91. A third control signal RS, which is generated in response to the load signal VL, indicates that the displaying element 91 is to be cleared. The control signal RS is also generated in response to the first detection of the start control code S in the coded text line. Generation of the control signal SC is stopped in response to the load signal VL, and generation of the control signal LD is started in response to the load signal VL. A fourth control signal SS, which indicates the desired scrolling speed, is also generated by the gate circuit 89.

The output 97 of the multiplex circuit 82 of FIG. 7 is also coupled to an input of a decoder unit 92. The decoder unit 92 is provided with a shift register for storing the character codes of the characters to be displayed. In addition, the decoder unit 92 is provided with a decoder for converting the character codes stored in the shift register into control signals for the respective digits of the displaying element 92. The decoder unit 92 is of a usual type which causes the display of a space in response to,a serial control code (which does not define a character), such as the pause code P. The shift register of the decoder unit 92 is of a usual type which, in response to the control signal SC, causes a shift of the character codes received through the shift register, so as to achieve a horizontal scroll of the characters over the display element 91.

The shift of the codes through the shift register 80 and the shift register of the decoder unit 92 is controlled by the clock generator circuit 94. When the control signal SS is absent and, therefore, not available to the generator clock circuit 94 of FIG. 7, the output of a clock signal from the clock generator circuit 94 is disabled. In the event that control signal SS is present, than the output of the clock signal is enabled and a clock signal with a frequency defined by the signal value of the control signal SS is supplied directly to a clock input of the shift register of the decoder unit 92 and via OR-gate 95 to the shift register 80.

When the control signal SC is absent, the shift register of the decoder unit 92 of FIG. 7 is brought into a static mode in which characters can be loaded in memory locations addressed by an address generation circuit 93. The address generating circuit 93 is of usual type that indicates the next empty memory location of the shift register in the decoder unit 92. In the event that all available memory locations are used for storage of codes, the loading of newly supplied codes are no longer stored.

The operation of the display control unit 9 and the display unit 10 will be described hereinafter. In the event that the load signal VL indicates that at the output 65 of the codes of a coded text line are available, then multiplex circuit 82 is brought in a state in which the codes on the output 65 are supplied to the input of shift register 80. Consequently, all codes of the coded text line are shifted into the shift register 80. These codes are also supplied to the detection circuit 87 and the input of the decoder unit 92.

The detection circuit 87 supplies signals to the gate circuit 89 indicating the type of code supplied to the decoder circuit 92 of the display unit 10. The gate circuit 89 starts to generate the control signal LD in response to the detection of the first character code which is not a space character. Thereafter, the decoder circuit 92 starts loading characters in its shift register from the first memory location onwards, leading (i.e. initial) space codes and control codes of a coded text line which are not one of the control codes shown in FIG. 4 being ignored for loading. In order to illustrate this loading process, reference is made to FIG. 8a.

Figure 8A:
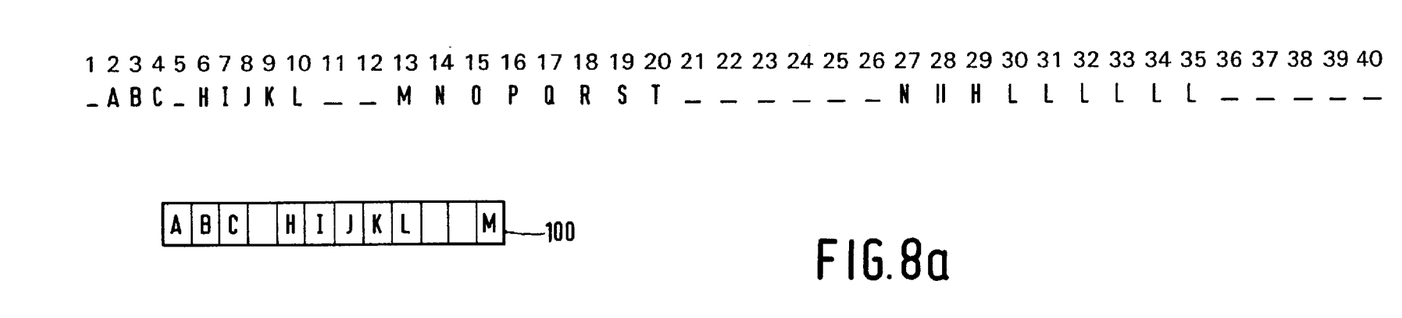
FIGS. 8*a*–*d* show different coded text lines and character strings displayed in response to receipt of coded text lines.

FIG. 8a shows a coded text line of forty codes, which are indicated by the characters defined by the codes. A space code is indicated by the symbol "-". The result of the receipt of this coded text line on the 12 digits displaying element 91 is shown within a window 100. The displaying element 91 shows the representations of the character codes in the positions 2–13 in the coded text line. The spade on the first position of the coded text line is ignored.

Figure 8B:
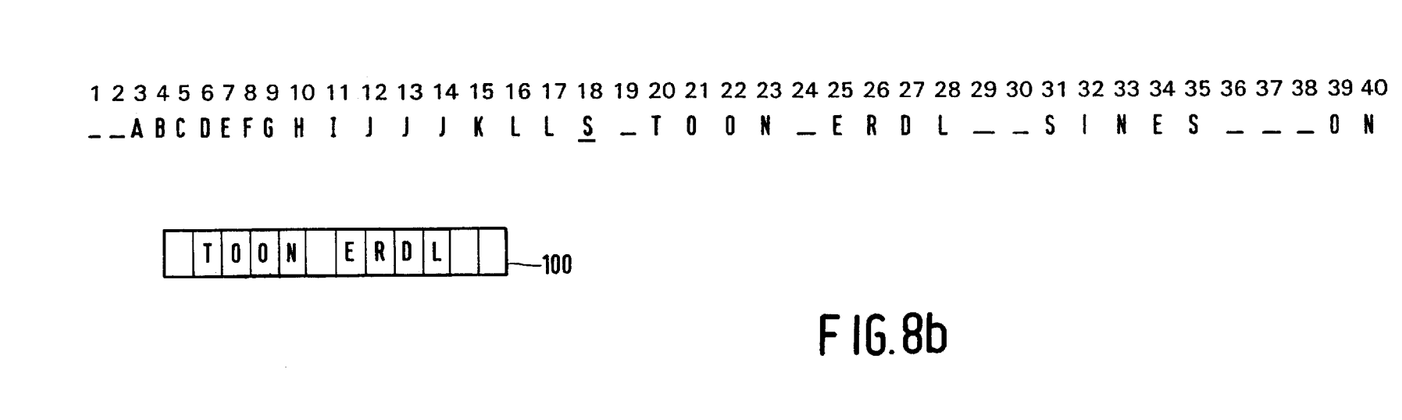

FIG. 8b shows another coded text line. This coded text line comprises the start control code S in position 18 of the coded text line. When this coded text line is supplied to the display control unit 9, this results in the characters defined by the codes in the positions 3–14 being displayed. However as soon as the start control code S is detected, the display is reset and characters defined by the codes on positions 19–30 are displayed in window 100.

Figure 8C:
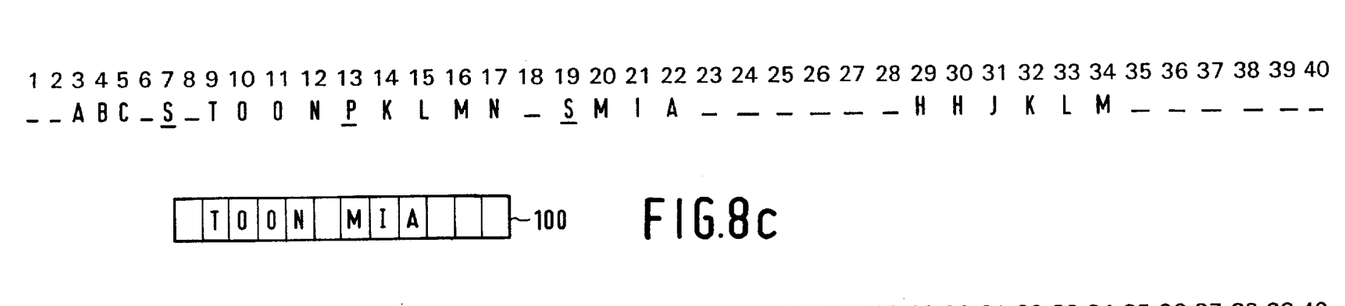

FIG. 8c shows a coded text line in which the start control code S in position 7 is followed by the pause control code P in position 13 in the coded text line. The coded text line also includes an additional start control code S in position 19. This result in the string of characters defined by the character codes between the first start control code S and the pause control code P being displayed. The pause control code P causes the display of a space after that character string. As soon as the start control code S in position 19 is detected, loading of character codes in the decoder circuit 92 is resumed until all twelve available memory location of the decoder circuit are occupied.

Figure 8D:
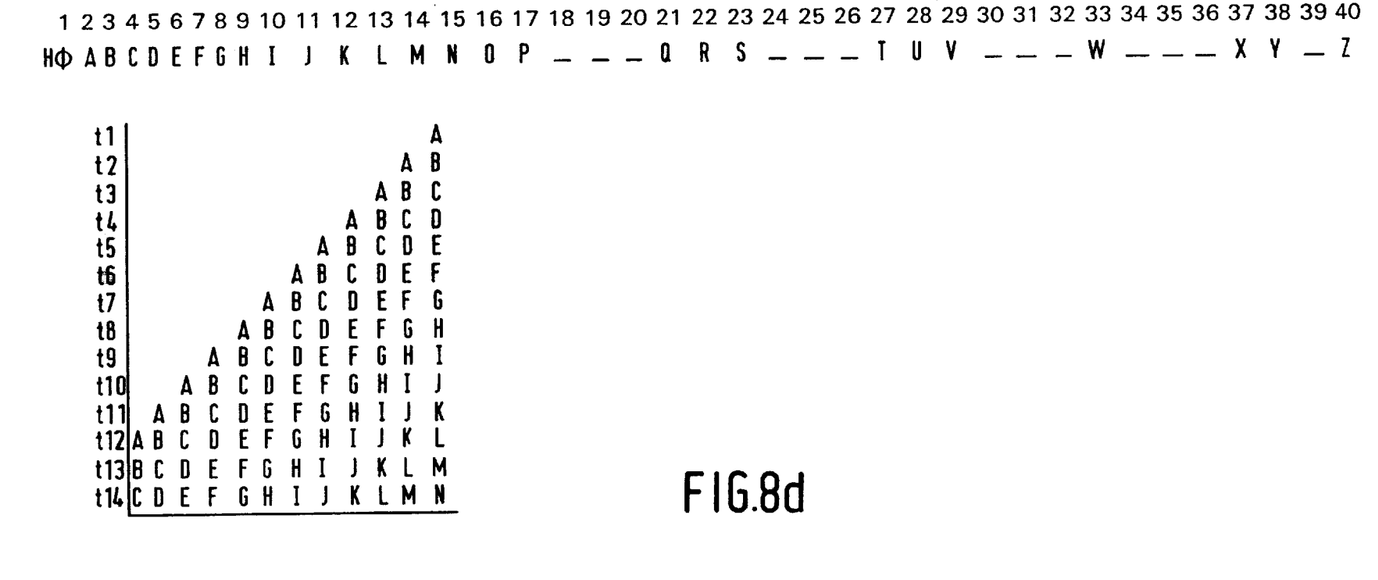

FIG. 8d shows an coded text line which includes the scroll control code H0 in the first position. In response to the detection of the scroll control code H0, the display control unit 9 is brought in the horizontal scrolling mode. After the coded text line received is loaded completely into the shift register 80, the multiplex circuit 82 is brought in a state in which the output 86 of the shift register 80 is fed to its output 97. The clock generator circuit 94 is set to a frequency corresponding to the value indicated by the control code H0. Consequently a horizontal scroll of the character string defined by the coded text line is realized. The contents of the twelve digit display element on subsequent clock moments t1, . . . , t14 is also shown in FIG. 8d. After the scroll of the complete character string defined by the coded text line has been finished, a next horizontal scrolling sequence may be initiated. These repeating scrolling sequence may be continued until the receipt of a coded text line without scrolling control codes.

A horizontal scrolling sequence for displaying the text defined by an arbitrary one of the coded text lines received can also be initiated by means of a user entered scroll command, since each coded text line comprising information to be displayed on the 1-line display unit 10 is stored completely in the shift register 80. In response to a user entered scroll command, the control signal SC is generated. Consequently the codes of the coded text line, available in the shift register 80, are shifted into the decoded unit 92 so as to achieve a horizontal scroll of the corresponding text on the twelve digit display element 91.

It is to be noted that other scrolling methods as described hereinbefore may be implemented. A non-limitative overview of suitable scrolling methods is discussed hereinafter.

The decoder unit 92 may cause a skip of leading and/or trailing spaces, or it may cause a continuous scroll until the last character is moved out of the display area. A Soft Scroll (character-column-wise), Character Scroll (character by character) or Word Scroll (word by word) mode may be used.

Two ways of activating scrolling are: automatically or by a user command. Automatic scrolling is controlled automatically, and it involves scrolling through the full text without any user interaction. It is noted that automatic scrolling cannot be activated if a "non-scrolling" code is included in a code of text line. Depending on the design of the hardware, various automatic scrolling methods may be implemented, for example:

(a) the text can be scrolled again and again;

(b) the text can be scrolled once, until the last character is moved out of the display area (This method is to be used exclusively for coded text lines of which the Packed Index equals "00 00h".);

(c) the text can be scrolled once, after which the beginning of the text is shown again on the display;

(d) the text can be scrolled once, after which the text marked by the start control code S and the pause control code P controls is shown on the display; and/or (e) the text as marked by the control codes S and P can be shown first for a (device dependent) period of time, after which one of the above mentioned scrolling methods can begin.

The scrolling may also be controlled manually, meaning that the text marked by the control codes S and P is displayed until a user's scroll command is received. Depending on the design of the hardware, various reactions can be implemented to occur as a result of a user's scroll command, for example:

(a) the text can be scrolled once, after which the end of the text is left on the display (This method is to be used for coded text lines of which the Packet Index equal "00 00h".);

(b) the text can be scrolled once, after which the beginning of the text is again shown on the display; and/or (c) the text can be scrolled once, after which the text marked by the control codes S and P is shown on the display.

The embodiment of the receiver as described hereinbefore is realized as a so-called hard-wired circuit. However it will be clear to the skilled man that embodiments realized by means of so-called program controlled circuits are also possible. In addition, it is to be noted that the invention is not limited to the use of the serial control codes described above. Other serial control codes, for control of the representation of character strings on a 1-line display with a limited number of character positions (i.e., digits), is also possible. Further, the response of the display control unit on the serial control codes may be different. Finally it is possible that the display control unit may be incorporated in a remote controller of the receiver 1.

What is claimed is:

1. A receiver, comprising:

character display means for displaying characters defined by a number of character codes included in a coded text line, said character display means having a predetermined number of character display positions which is less than the number of character codes included in the coded text line;

means for receiving an information signal having main data and sub data, the sub data including the coded text line, which coded text line also includes a number of serial control codes intermixed among the character codes for use in controlling display of the characters on said display means; and display control means for controlling display of the characters in accordance with the serial control codes, which serial control codes include horizontal scrolling control codes for use in causing and/or controlling a horizontal scrolling of the characters on said display means.

2. The receiver as claimed in claim 1, further comprising storage means for storing the coded text line in a memory; and wherein said display control means is adapted to initiate, in response to the horizontal scrolling control codes, said display means to horizontally scroll through the characters.

3. The receiver as claimed in claim 2, further comprising entry means for manually entering scroll commands; and wherein said display control means is further adapted to control the scroll in accordance with the scroll commands.

4. The receiver as claimed in claim 2, wherein said display control means is further adapted to cause said display means to horizontally scroll through the characters with a speed dependent on the horizontal scrolling control codes.

5. The receiver as claimed in claim 3, wherein said display control means is further adapted to cause said display means to horizontally scroll through the characters with a speed dependent on the horizontal scrolling control codes or the scroll commands.

6. The receiver as claimed in claim 1, wherein the sub data includes text packets which each include a coded text line and parallel control codes, certain of the text packets including an indicating control code indicating that that text packet includes a coded text line with text information to be displayed on said display means; and the receiver further comprises means for determining which of the text packets include the indicating control code, and means for exclusively supplying the certain text packets to said display control means.

7. An information transfer system, comprising:

the receiver as claimed in claim 1; and a transmitter for transmitting the information signal via a transfer medium to the receiver.

8. The receiver as claimed in claim 1, wherein the serial control codes further include marking codes for marking a portion of the character codes; and said display control means includes selecting means for selecting which of the characters are to be displayed on said display means on the basis of the marking codes.

9. A transmitter for producing an information signal for transmission through a transmission medium, the transmitter comprising:

main data generator means for generating main data;

sub data generator means for generating sub data including a coded text line having a number of character codes defining characters, and a number of serial control codes intermixed among the character codes for use in controlling display of the characters on a display unit having a predetermined number of character display positions which is less than the number of character codes in the coded text line, which serial control codes include horizontal scrolling control codes for use in causing and/or controlling a horizontal scrolling of the characters on the display unit; and combining means for combining the main data and the sub data into the information signal.

10. The transmitter as claimed in claim 9, wherein the serial control codes include a code specifying a speed at which the horizontal scrolling should occur.

11. The transmitter as claimed in claim 9, wherein the serial control codes further include marking codes for marking a portion of the character codes defining a group of the characters to be displayed on the display unit.

12. The transmitter as claimed in claim 9, wherein the sub data includes text packets which each includes a coded text line and parallel control codes, certain of the text packets including an indicating code indicating that that text packet includes a coded text line with text information to be displayed on the display unit.

13. The transmitter as claimed in claim 12, wherein the coded text line of each of the certain text packets includes a number of character codes and a number of serial control codes.

14. An information transfer system, comprising:
the transmitter as claimed in claim 9; and
a receiver for receiving the information signal from the transmission medium and displaying the characters on the display unit.

15. The system as claimed in claim 14, wherein the receiver includes the display unit.

16. A record carrier having an information signal recorded thereon, the information signal including:
main data; and
sub data including a coded text line having a number of character codes defining characters, and a number of serial control codes intermixed among the character codes for use in controlling display of the characters on a display unit having a predetermined number of character display positions which is less than the number of character codes included in the coded text line, which serial control codes include horizontal scrolling control codes for use in causing and/or controlling a horizontal scrolling of the characters on the display unit.

17. The record carrier as claimed in claim 16, wherein the serial control codes includes a code specifying a speed at which the horizontal scrolling should occur.

18. The record carrier as claimed in claim 16, wherein the serial control codes further include marking codes for marking a portion of the character codes defining a group of the characters to be displayed on the display unit.

19. The record carrier as claimed in claim 16, wherein the sub data includes text packets which each including a coded text line and parallel control codes, certain of the text packets include an indicating code indicating that that text packet includes a coded text line with text information to be displayed on the display unit.

20. A receiver, comprising:
character display means for displaying at least some characters defined by a number of character codes included in a coded text line, said character display means having a predetermined number of character display positions which is less than the number of character codes included in the coded text line;
means for receiving an information signal having main data and sub data, the sub data including the coded text line, which coded text line also includes a number of serial control codes intermixed among the character codes for use in controlling display of the at least some characters which are to be displayed on said display means; and
display control means for controlling display of the at least some characters which are to be displayed in accordance with the serial control codes, which serial control codes include marking codes for marking a portion of the character codes defining a group of the characters to be displayed on said display means.

21. The receiver as claimed in claim 20, wherein said display control means includes selecting means for selecting which of the characters are to be displayed on said display means on the basis of the marking codes.

22. The receiver as claimed in claim 21, wherein the marking codes include at least a start code preceding the portion of the character codes marked by the marking codes, and a pause code following the portion of the character codes marked by the marking codes.

23. The receiver as claimed in claim 22, wherein said display control means is adapted to (a) cause a space-type character to be displayed on said display means in response to the pause code and (b) prohibit any character from being displayed on said display means in response to the start code.

24. The receiver as claimed in claim 20, wherein the sub data includes text packets which each include a coded text line and parallel control codes, certain of the text packets including an indicating control code indicating that that text packet includes a coded text line with text information to be displayed on said display means; and the receiver further comprises means for determining which of the text packets include the indicating control code, and means for exclusively supplying the certain text packets to said display control means.

25. An information transfer system, comprising:
the receiver as claimed in claim 20; and
a transmitter for transmitting the information signal via a transfer medium to the receiver.

26. A transmitter for producing an information signal for transmission through a transmission medium, the transmitter comprising:
main data generator means for generating main data;
sub data generator means for generating sub data including a coded text line having a number of character codes defining characters, and a number of serial control codes intermixed among the character codes for use in controlling display of at least some of the characters on a display unit having a predetermined number of character display positions which is less than the number of character codes in the coded text line, which serial control codes include marking codes for marking a portion of the character codes defining a group of the characters to be displayed on the display unit; and
combining means for combining the main data and the sub data into the information signal.

27. The transmitter as claimed in claim 26, wherein the marking codes include at least a start code preceding the portion of the character codes marked by the marking codes, and a pause code following the portion of the character codes marked by the marking codes.

28. The transmitter as claimed in claim 26, wherein the sub data includes text packets which each includes a coded text line and parallel control codes, certain of the text packets including an indicating code indicating that that text packet includes a coded text line with text information to be displayed on the display unit.

29. An information transfer system, comprising:
the transmitter as claimed in claim 26; and
a receiver for receiving the information signal from the transmission medium and displaying the characters on the display unit.

30. The system as claimed in claim 29, wherein the receiver includes the display unit.

31. A record carrier having an information signal recorded thereon, the information signal including:
main data; and
sub data including a coded text line having a number of character codes defining characters, and a number of serial control codes intermixed among the character codes for use in controlling display of at least some of the characters on a display unit having a predetermined number of character display positions which is less than the number of character codes included in the coded text line, which serial control codes include marking codes for marking a portion of the character codes defining a group of the characters to be displayed on the display unit.

32. The record carrier as claimed in claim 31, wherein the marking codes includes a start code preceding the portion of the character codes marked by the marking codes, and a pause code following the portion of the character codes marked by the marking codes.

33. The record carrier as claimed in claim 31, wherein the sub data includes text packets which each includes a coded text line and parallel control codes, certain of the text packets include an indicating code indicating that that text packet includes a coded text line with text information to be displayed on the display unit.

* * * * *